(12) United States Patent
Rupoli

(10) Patent No.: US 12,397,340 B2
(45) Date of Patent: Aug. 26, 2025

(54) LOADING ASSEMBLY FOR OBLONG, IN PARTICULAR METALLIC, ELEMENTS

(71) Applicant: SCHNELL S.P.A., Colli al Metauro (IT)

(72) Inventor: Alberto Rupoli, Colli al Metauro (IT)

(73) Assignee: SCHNELL S.P.A., Colli al Metauro (IT)

( * ) Notice: Subject to any disclaimer, the term of this patent is extended or adjusted under 35 U.S.C. 154(b) by 0 days.

(21) Appl. No.: 18/564,424

(22) PCT Filed: May 30, 2022

(86) PCT No.: PCT/IT2022/050150
§ 371 (c)(1),
(2) Date: Nov. 27, 2023

(87) PCT Pub. No.: WO2022/249216
PCT Pub. Date: Dec. 1, 2022

(65) Prior Publication Data
US 2024/0253104 A1    Aug. 1, 2024

(30) Foreign Application Priority Data

May 28, 2021    (IT) .................. 102021000014078

(51) Int. Cl.
*B21F 23/00*    (2006.01)
*B21D 43/00*    (2006.01)

(52) U.S. Cl.
CPC .......... *B21F 23/007* (2013.01); *B21D 43/006* (2013.01)

(58) Field of Classification Search
CPC .... B21D 43/006; B21D 7/024; B21D 43/285; B65G 47/8846; B65G 2201/0217; B65G 47/82; B21F 23/007; B23D 47/042
See application file for complete search history.

(56) References Cited

U.S. PATENT DOCUMENTS

| | | | | |
|---|---|---|---|---|
| 3,029,922 A | * | 4/1962 | Rau | B21B 43/003 198/468.7 |
| 3,270,864 A | * | 9/1966 | Kay | B23Q 7/001 198/777 |
| 4,174,662 A | * | 11/1979 | Klusmier | B65B 27/10 414/745.9 |
| 4,204,788 A | * | 5/1980 | Massey | B65B 27/10 198/456 |
| 4,321,995 A | * | 3/1982 | Dell | B65G 25/04 198/774.1 |

(Continued)

FOREIGN PATENT DOCUMENTS

| | | | | |
|---|---|---|---|---|
| AT | 393641 B | * | 11/1991 | ........... B21D 43/285 |
| DE | 32 43 492 A1 | | 5/1984 | |

(Continued)

OTHER PUBLICATIONS

International Search Report for PCT/IT2022/050150 dated Sep. 3, 2022 (3 pages).

*Primary Examiner* — Gregory W Adams
(74) *Attorney, Agent, or Firm* — Tutunjian & Bitetto, P.C.

(57) ABSTRACT

The loading assembly for oblong elements, in particular metal elements, includes a movable selector member and a chute associated with the selector member. The loading assembly is associated with a transfer seat to collect a number of elements loaded on the chute by means of the selector member.

12 Claims, 19 Drawing Sheets

(56) References Cited

U.S. PATENT DOCUMENTS

| | | | | |
|---|---|---|---|---|
| 4,446,961 | A | * | 5/1984 | Klusmier ............ B21B 39/002 |
| | | | | 198/443 |
| 4,732,066 | A | | 3/1988 | Del Fabro et al. |
| 4,889,467 | A | | 12/1989 | Zahlaus |
| 5,095,726 | A | | 3/1992 | Mackall et al. |
| 5,174,351 | A | * | 12/1992 | Lindenblatt ............ B65G 25/08 |
| | | | | 144/356 |
| 5,238,353 | A | * | 8/1993 | Kollross ............ A22C 15/007 |
| | | | | 198/803.14 |
| 5,374,157 | A | * | 12/1994 | Allard ................... B65G 25/02 |
| | | | | 198/774.3 |
| 5,413,207 | A | * | 5/1995 | Pong .................... B21B 43/003 |
| | | | | 198/463.3 |
| 5,901,596 | A | | 5/1999 | Tetzloff et al. |
| 8,915,694 | B2 | * | 12/2014 | Rigolone ................ B23B 13/10 |
| | | | | 414/745.9 |
| 2004/0261485 | A1 | | 12/2004 | Peruzzo et al. |

FOREIGN PATENT DOCUMENTS

| | | | | |
|---|---|---|---|---|
| EP | 0432468 A2 | * | 6/1991 | ............ B21D 11/12 |
| EP | 3 031 543 A1 | | 6/2016 | |
| FR | 2 262 564 A1 | | 9/1975 | |
| TW | M287190 U | * | 2/2006 | ............ B21D 11/12 |

\* cited by examiner

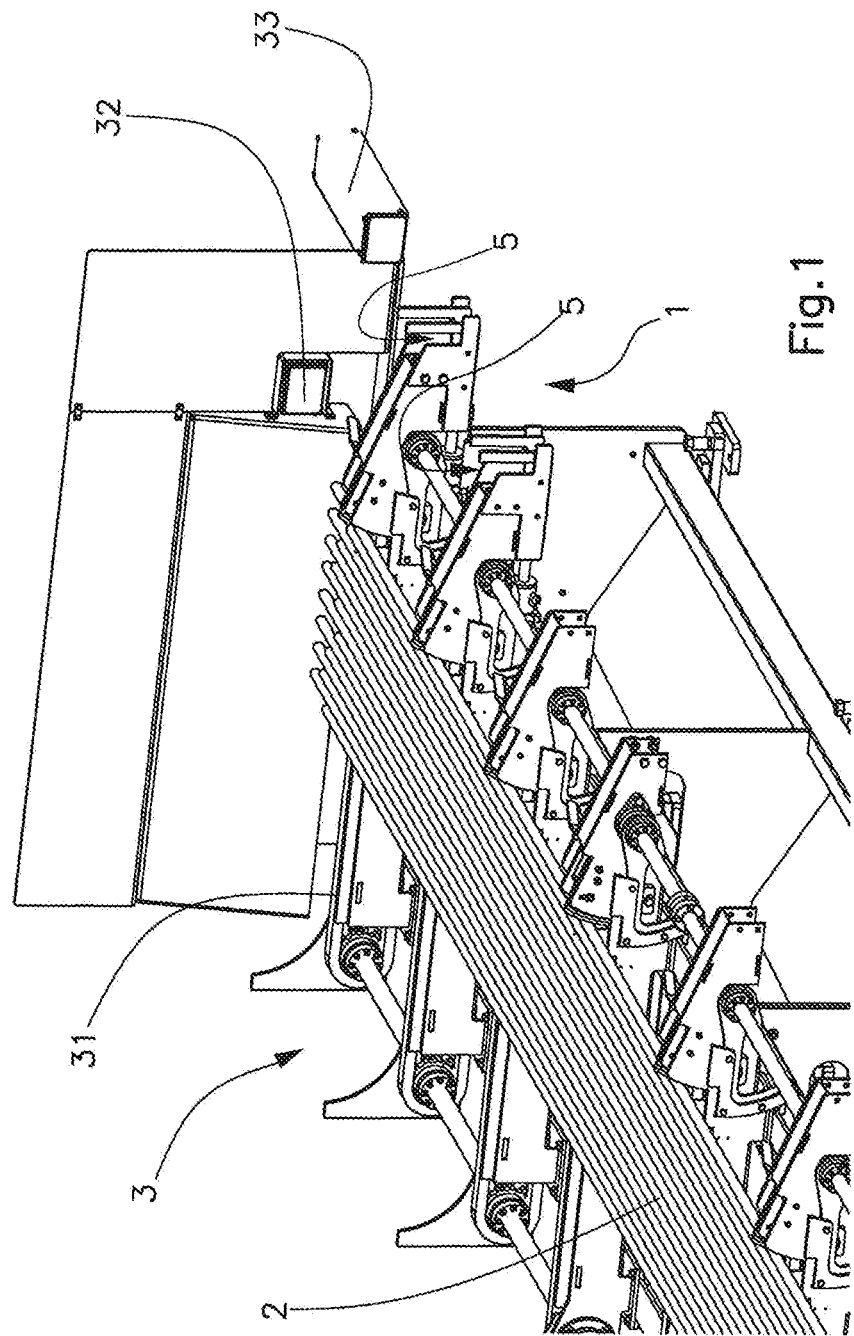

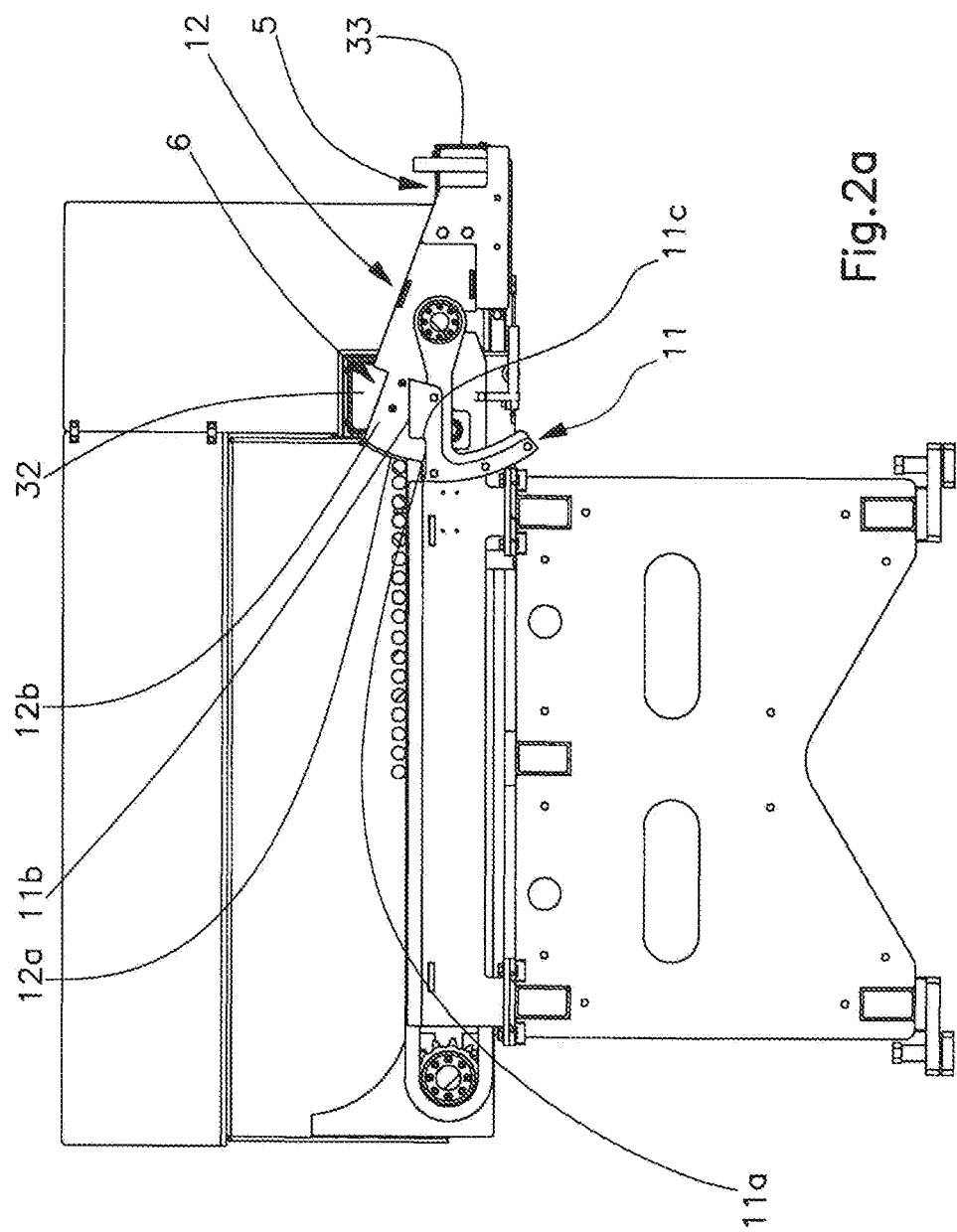

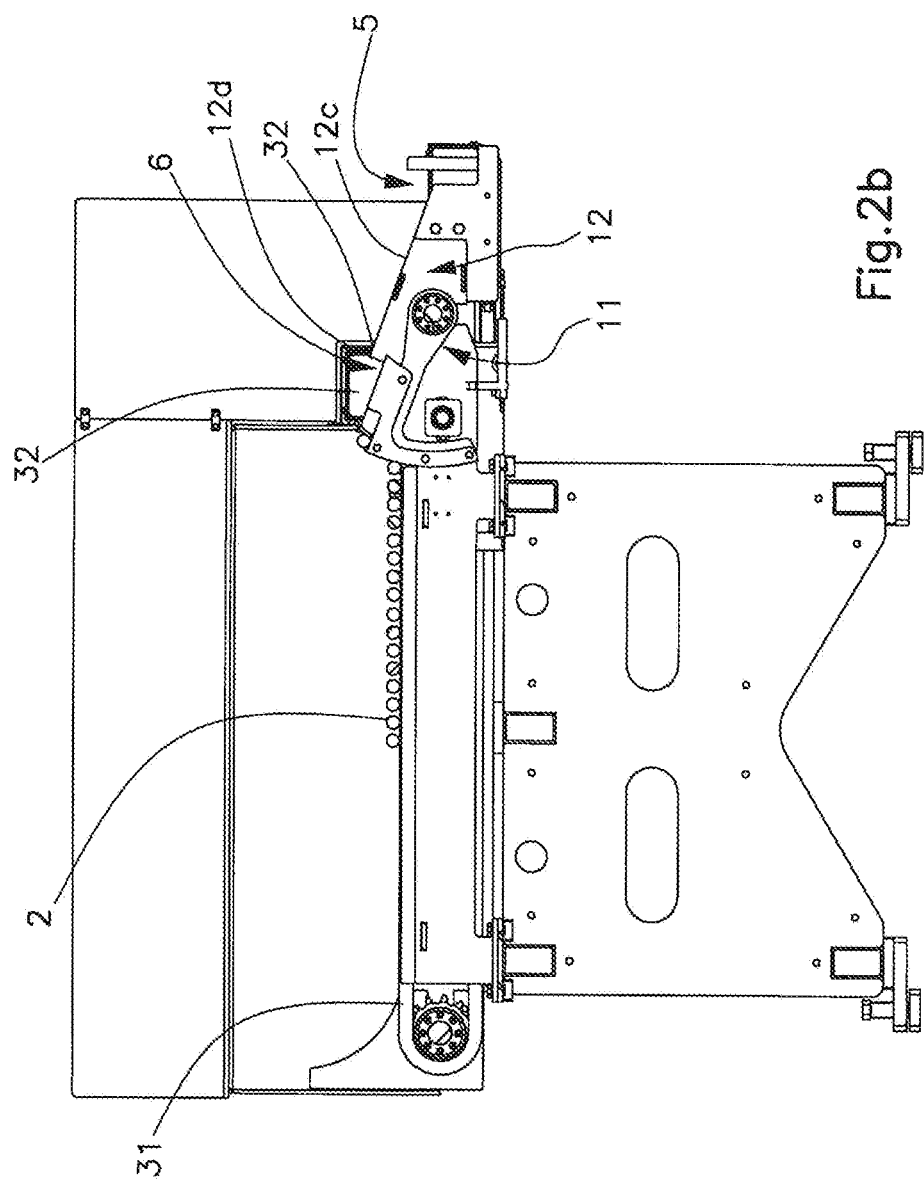

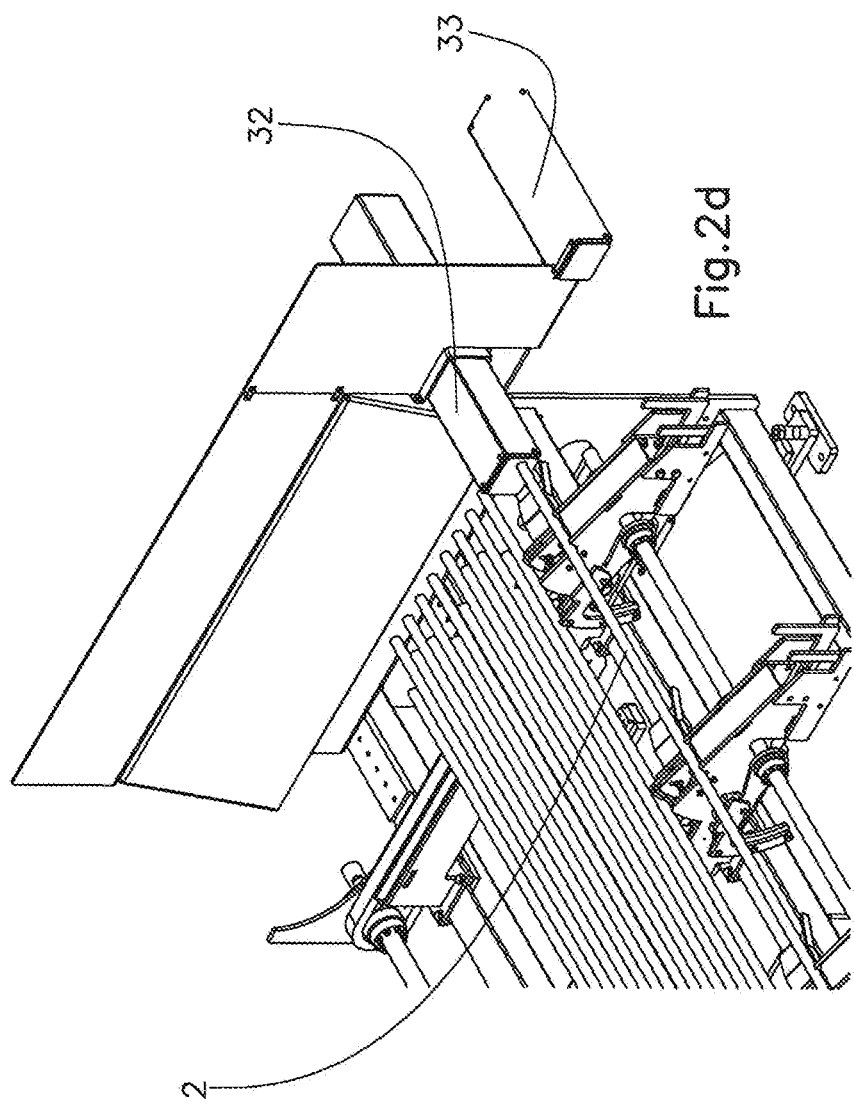

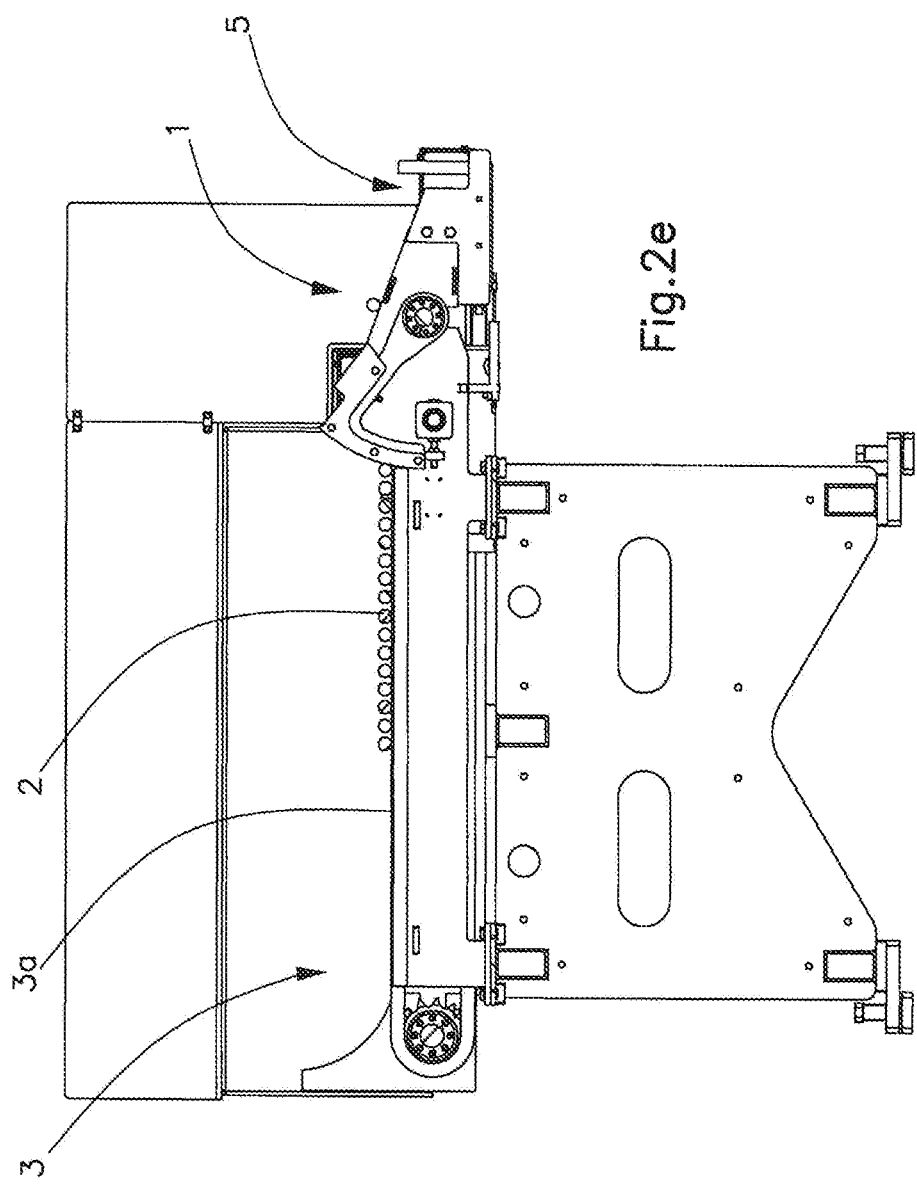

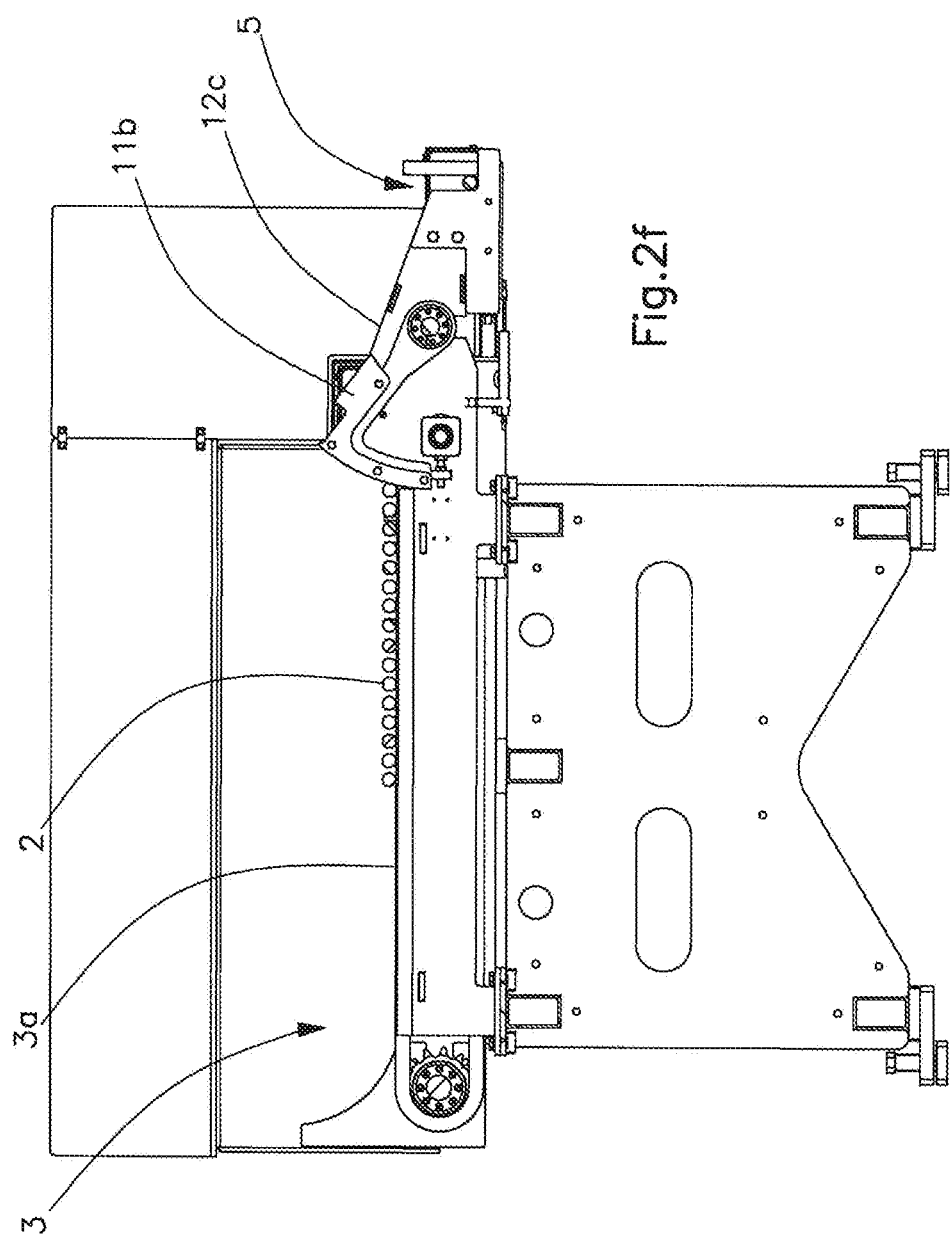

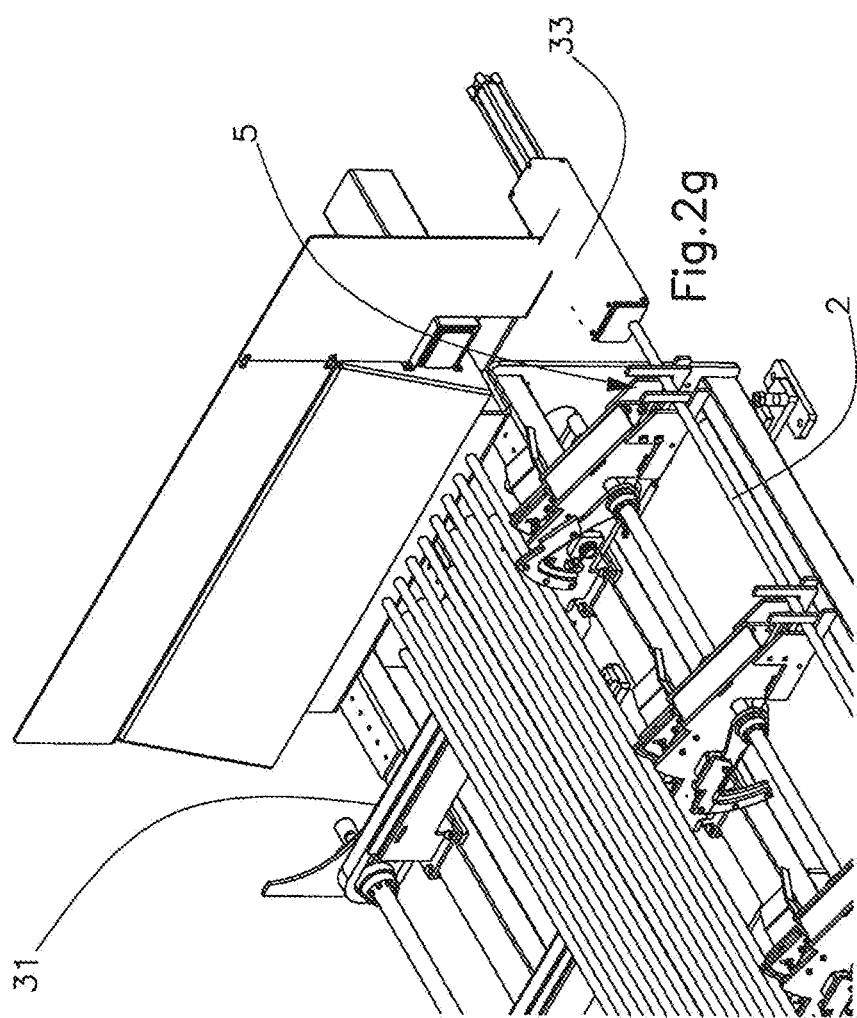

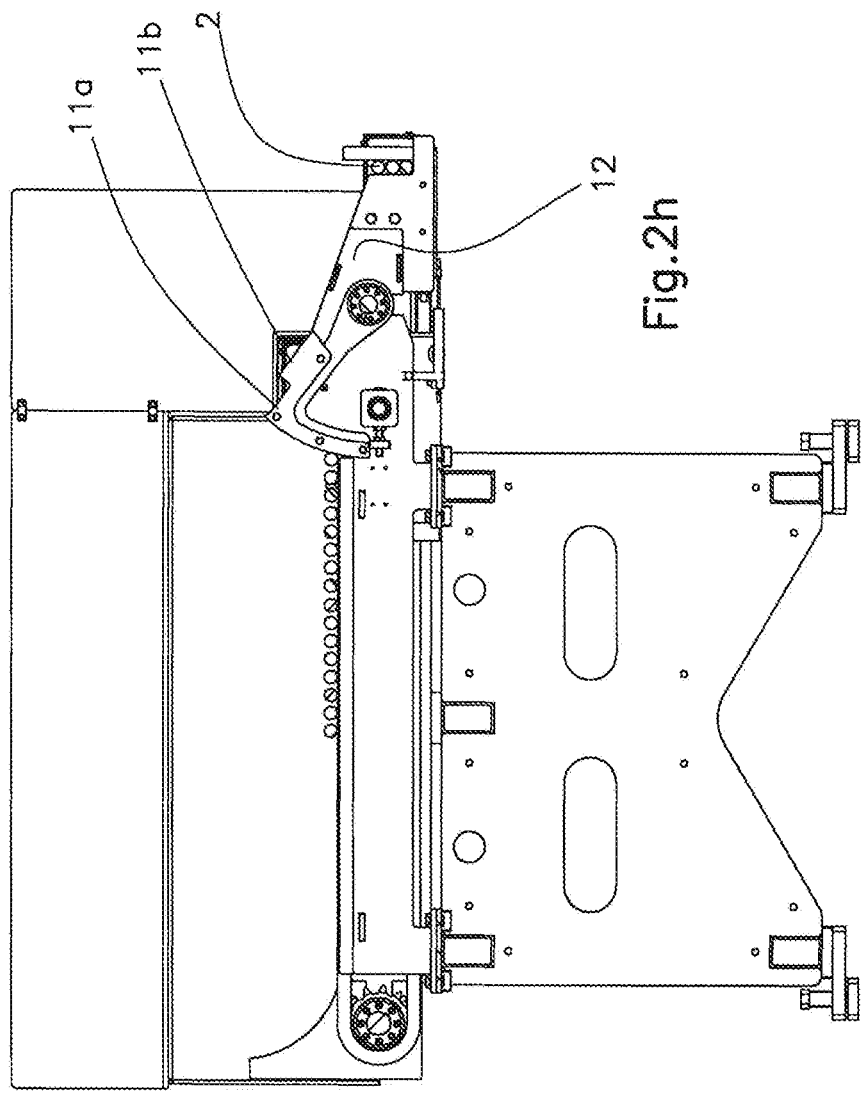

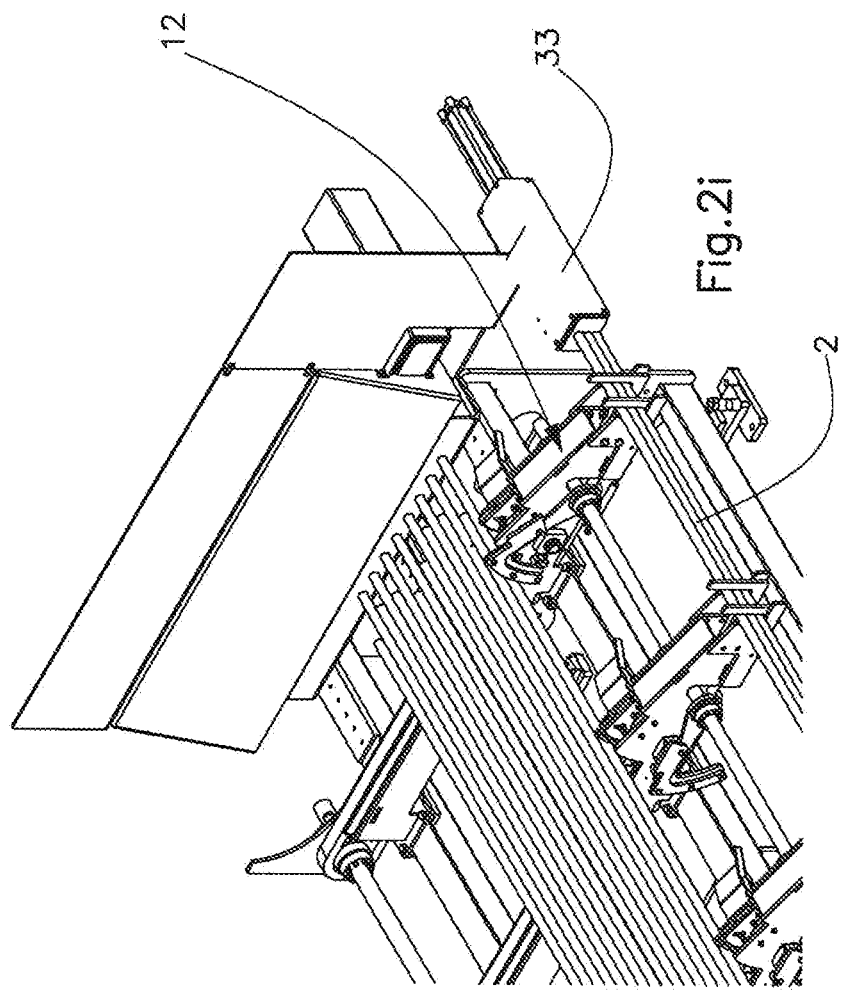

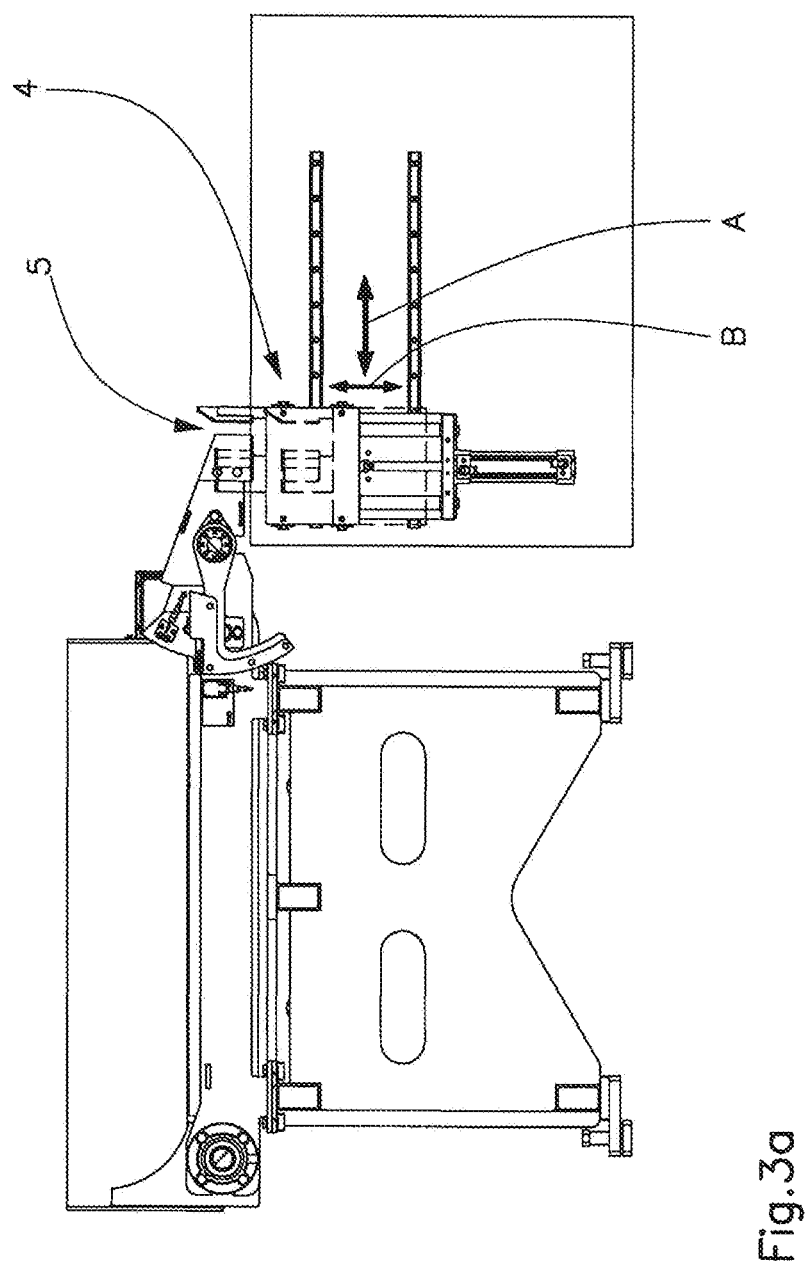

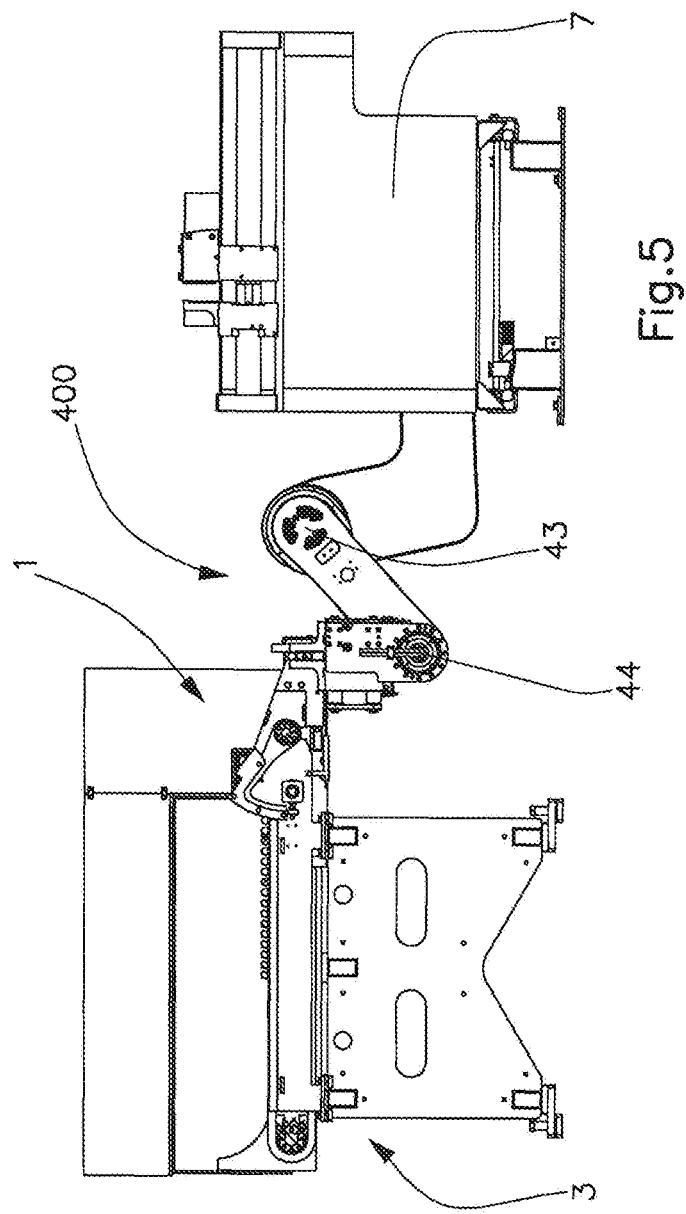

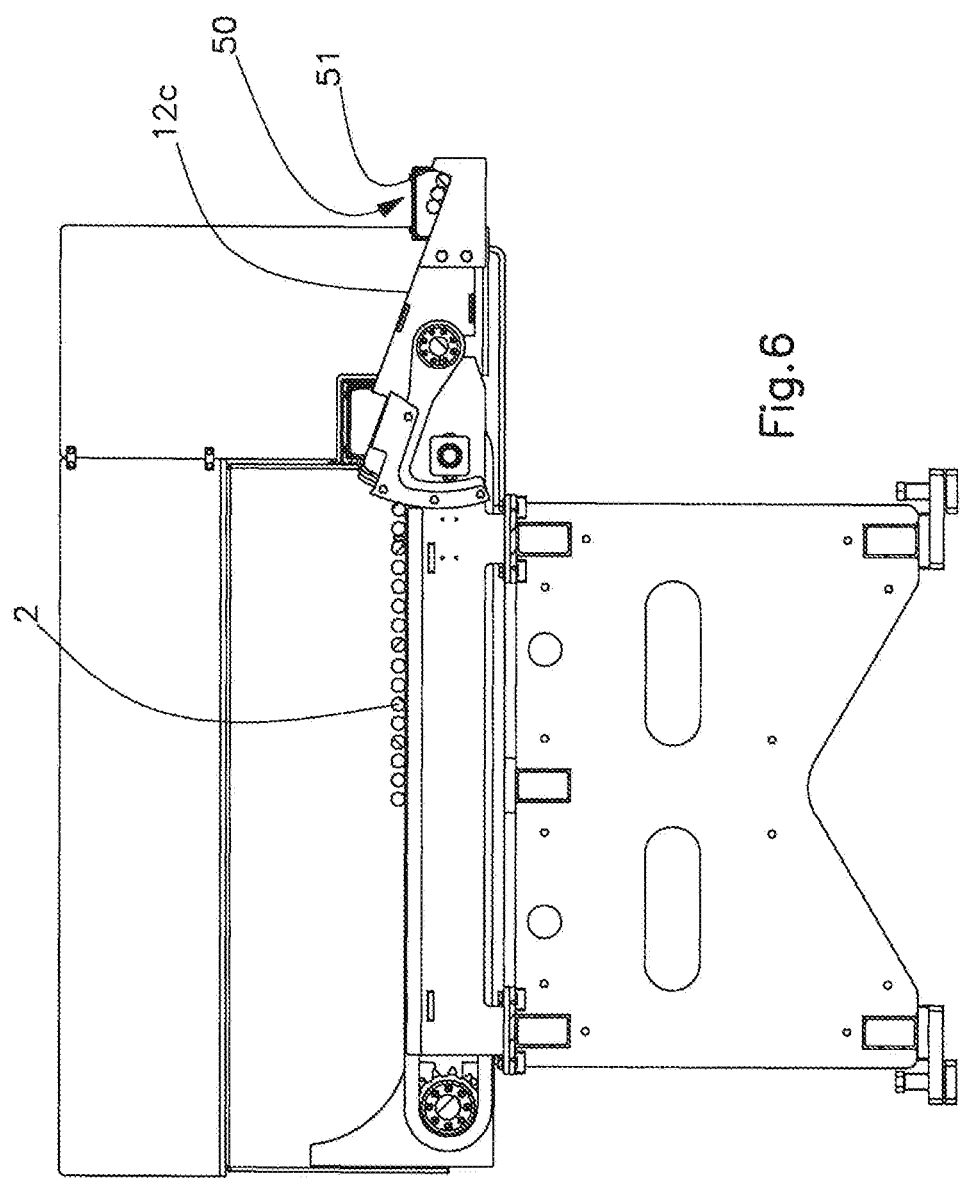

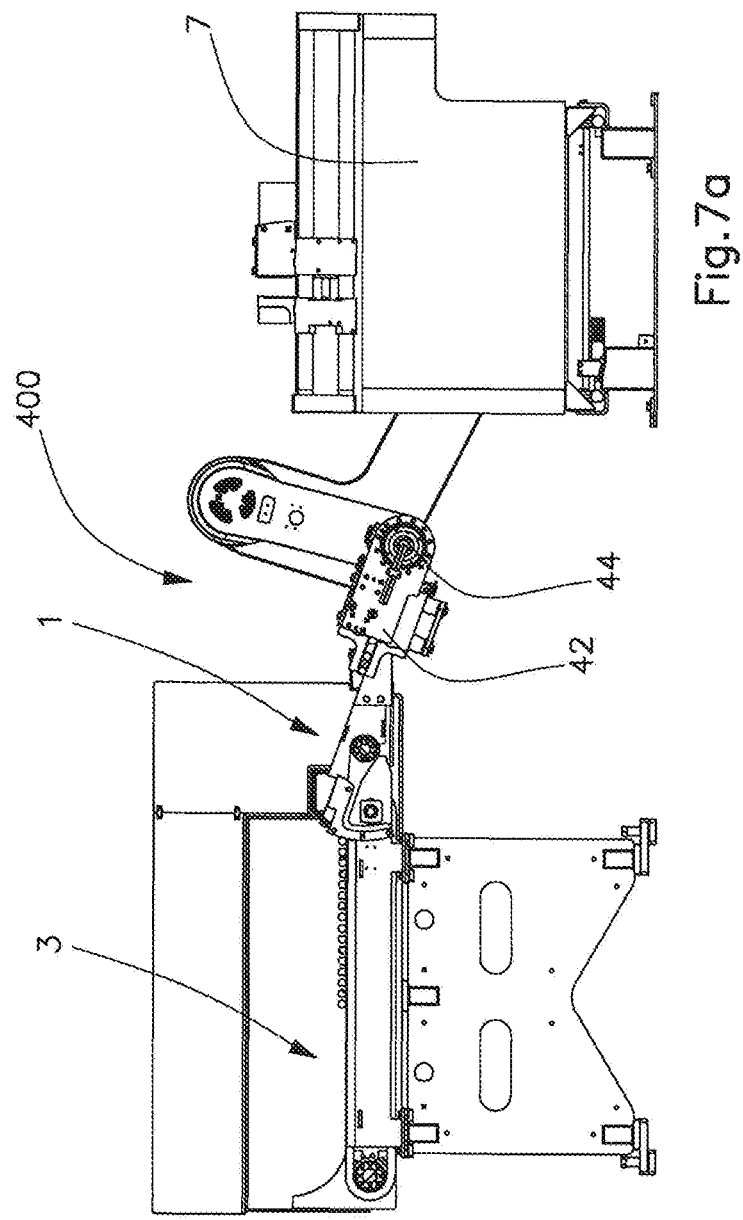

LOADING ASSEMBLY FOR OBLONG, IN PARTICULAR METALLIC, ELEMENTS

TECHNICAL FIELD

The present invention relates to a loading assembly for oblong, in particular metal, elements, for example bars, in particular iron rods for reinforced concrete, possibly even obtained by cutting from bars or rolls.

PRIOR ART

Apparatuses are known for processing oblong, in particular metal, elements, for example metal profiles and similar products in bars, which require a desired number of such elements to be fed, therefore loaded onto a specific operating station, for example for performing welding, cutting, curving and/or bending.

In particular, in the case of curving and/or bending machines, for producing shaped products, it may be necessary to select metal elements individually, in pairs or in small groups consisting of a given number of elements.

DE3243492 discloses a device for separating oblong elements.

EP3031543, in the name of the Applicant, and U.S. Pat. No. 4,889,467 disclose a device for loading and unloading bars in combination with an apparatus for processing, in particular bending, bars.

The known solutions do not provide adequate solutions to satisfy the needs of the specific sector, both for the overall dimensions and for the cost of the necessary equipment.

In particular, the known devices do not satisfy the need to ensure an ordered feeding of the metal elements to the processing apparatuses arranged downstream. For example, in the case of bending machines the intervention of an operator is required, to ensure that the bars are fed in the appropriate configuration for processing, in particular that the respective ends are aligned at the same position along a longitudinal direction, to be bent correctly, especially in a single bending cycle. An unaligned positioning of the elements before processing may, in fact, cause unacceptable inaccuracies in the processed pieces which, therefore, must be discarded.

In particular, in the case of bars for the reinforcement of reinforced concrete, the alignment operations may be difficult, especially in the case in which more bars are fed. The bars, in fact, are generally long, also in relation to the transversal dimension, and therefore they are heavy, reaching up to 12 or 24 meters in length and starting from 6 mm in diameter. The bars, therefore, tend to get tangled, thus making their handling difficult, in particular for a reciprocal alignment that guarantees correct execution of subsequent processing.

A further critical aspect that makes positioning operations difficult is the irregular, not smooth, shape of the external surface of the bars, aimed at ensuring effective adherence to the building material. In fact, the bars almost always have ribs on the outside to improve the aforementioned adhesion capacity.

These circumstances make the alignment of the bars very tiring for the operators involved.

SUMMARY OF THE INVENTION

The aim of the present invention is to solve the problems mentioned in the known art, devising a loading unit for oblong, in particular metal, elements which permits, automatically and in a versatile manner, the loading of the bars, optimizing the overall dimensions and the productivity.

As part of this aim, a further object of the present invention is to provide an assembly that carries out the loading with a simple and functional structure, with reliable, precise and highly flexible operation.

The aforementioned objects are achieved, according to the invention, by the loading assembly of the present application.

The loading assembly for oblong, in particular metal, elements preferably operates in combination with a device for feeding element, adapted to receive the elements on a respective feeding plane, oriented according to a longitudinal direction and arranged on said plane in a preferably ordered manner, side by side to each other.

The loading assembly includes a transfer device for transferring the same elements.

Oblong element means an element in which the longitudinal dimension is considerably greater, by at least one order of magnitude, preferably several orders of magnitude, of the respective transverse dimension. These elements may in fact reach a longitudinal dimension of about 25 meters.

The loading assembly is preferably interposed between the feeding device and the transfer device.

The loading assembly includes a movable selector member, a chute associated with the selector member and cooperates with a transfer seat to collect a number of elements loaded on the chute by means of the selector member.

The selector member is movable relative to the chute of a lifting motion between a lowered position below the feeding surface and a raised position up to the chute, to intercept and transfer a number of the aforementioned elements from the feeding surface to the chute.

The transfer device is movable with a transfer motion between an engagement configuration approached to the transfer seat, in particular to the chute of the loading assembly, to engage the number of elements inserted in the transfer seat, and a transport configuration, spaced therefrom, to transfer the number of elements.

The transfer motion is preferably in a transverse direction, in particular perpendicular to the aforementioned longitudinal direction.

The selector member preferably shapes an arm comprising a load portion and an output portion.

The chute preferably comprises an abutment section cooperating with the loading portion of the selector member to separate the number of elements from the feeding surface and an output section for receiving at the exit the number of elements coming out of the output portion of the selector member.

In the aforementioned raised position, an upper surface of the output portion of the selector member is at least approached to an upper surface of the output section of the chute, so as to define a sliding or rolling plane for the number of elements.

The loading assembly according to the invention is therefore able to reliably ensure a precise and correct selection of the number of elements to be loaded, even in multiple selection cycles, by transporting them through the output section of the chute to the transfer seat.

The loading assembly advantageously has the cooperation of operating members, the selector member and the chute, and the transfer device, which are compact and efficient, for loading and transferring the desired number of elements.

In fact, the loading assembly is reduced in size, as well as being very versatile in application on multiple apparatuses for processing the elements.

According to a particular, advantageous aspect, the abutment section is preferably arranged backward with respect to at least part of the loading portion of the selector member, which therefore protrudes with respect thereto, so that a selected number of elements may be intercepted between the loading portion and the abutment section is transported by the selector member, remaining in abutment with the abutment section, to be thus guided during the lifting motion of the selector member.

The chute preferably comprises an intermediate section between the loading section and the output section, while a shoulder section is preferably interposed between the intermediate section and the output section to define an intermediate seat for the number of elements.

The selector member is preferably movable through an intermediate position, in which the number of elements is released from the loading portion to the intermediate section of the chute in the intermediate seat.

The selector member preferably comprises a shoulder between the loading portion and the output portion to house at least one element.

The loading assembly comprises alignment means aligned with the transfer seat or with an intermediate seat, to submit the number of elements to respective alignment operations.

Additional alignment means may be provided aligned with the transfer seat or with an intermediate seat, to submit the number of elements to respective alignment operations.

Thanks to the presence of the alignment means aligned with the transfer seat and/or with an intermediate seat, the alignment operations are effective as they operate on elements selected by the selector and loaded on the chute, then previously separated and placed side by side in an orderly manner. In this way, the easily aligned elements can be transferred directly to the operating machine thanks to the transfer device, avoiding any risk of losing the alignment along the way.

The presence of additional alignment means may further increase the effectiveness of the alignment, as it permits to carry out the operation progressively in several stages, considering the alignment means operating at the intermediate seat and at the transfer seat.

The provision of effective alignment means which guarantees the correct positioning of the elements before processing therefore makes the processing station completely automatic, avoiding that operators have to intervene manually only for this operation.

The selector member is preferably oscillating with respect to the chute around a respective longitudinal axis.

The transfer device preferably shapes, by carrying it, the aforementioned transfer seat or cooperates with the chute to shape it. Advantageously, the transfer seat may therefore receive the number of elements loaded on the chute, when the transfer device is in the approached engagement configuration. The fact that the transfer seat is shaped at least in part by the transfer device simplifies the transfer motion. In practice, the insertion of the loaded elements takes place directly on the transfer device, thus saving the device from a stroke of collection of the elements to be transferred.

Furthermore, this circumstance allows easy adjustment of the transverse width of the transfer seat as a function of the transverse dimension of the elements to be loaded, for example by simply varying the approach of the transfer device to the chute.

Alternatively, the transfer seat can be shaped by an end portion of the chute itself.

The transfer device is preferably made by means of a receiving member shaping said transfer seat and is movable between said adjacent configuration, at the transfer seat cooperating at the chute of the loading assembly, to receive the number of elements from the chute, and the transport, spaced away configuration, to transfer the number of loaded elements.

The receiving member is preferably of the type with jaws that are mutually movable between an open configuration and a closed configuration. In this case, the transfer seat is preferably shaped, when the receiving member is in said engagement configuration, by an end wall of the chute and by a jaw of the receiving member arranged in the open configuration.

The transfer device may alternatively or additionally comprise an articulated arm and a gripping member, articulated to the articulated arm around an orientation axis.

Said articulated arm may comprise a first member and a second member mutually articulated at an intermediate axis.

BRIEF DESCRIPTION OF THE DRAWINGS

The details of the invention will become more evident from the detailed description of a preferred embodiment of the loading assembly for oblong, in particular metal, elements such as bars, for example iron rods for reinforced concrete, illustrated by way of example in the accompanying drawings, wherein:

FIG. 1 shows a perspective view of the loading assembly according to the invention;

FIGS. 2a, 2b, 2c show a side view of the same loading assembly, in successive operating steps;

FIG. 2d shows a perspective view of the loading assembly in a further operating step;

FIGS. 2e, 2f show a side view of the loading assembly in further operating steps;

FIG. 2g shows a perspective view of the loading assembly according to the invention in an operational step of alignment;

FIGS. 2h and 2i respectively show a lateral and perspective view of the loading assembly in a feeding and aligning step;

FIGS. 3a, 3b and 3c respectively show a side view of the loading assembly in cooperation with a device for transferring the elements, in successive operating steps;

FIG. 5 shows a side view of the loading assembly in an operating step of collection according to a different operating mode;

FIG. 6 shows a side view of the loading assembly according to a different embodiment; and FIGS. 7a and 7b respectively show a lateral and perspective view of the loading assembly according to the embodiment illustrated in FIG. 6, in an operating step of collection of the elements.

DETAILED DESCRIPTION

Figure 2C:
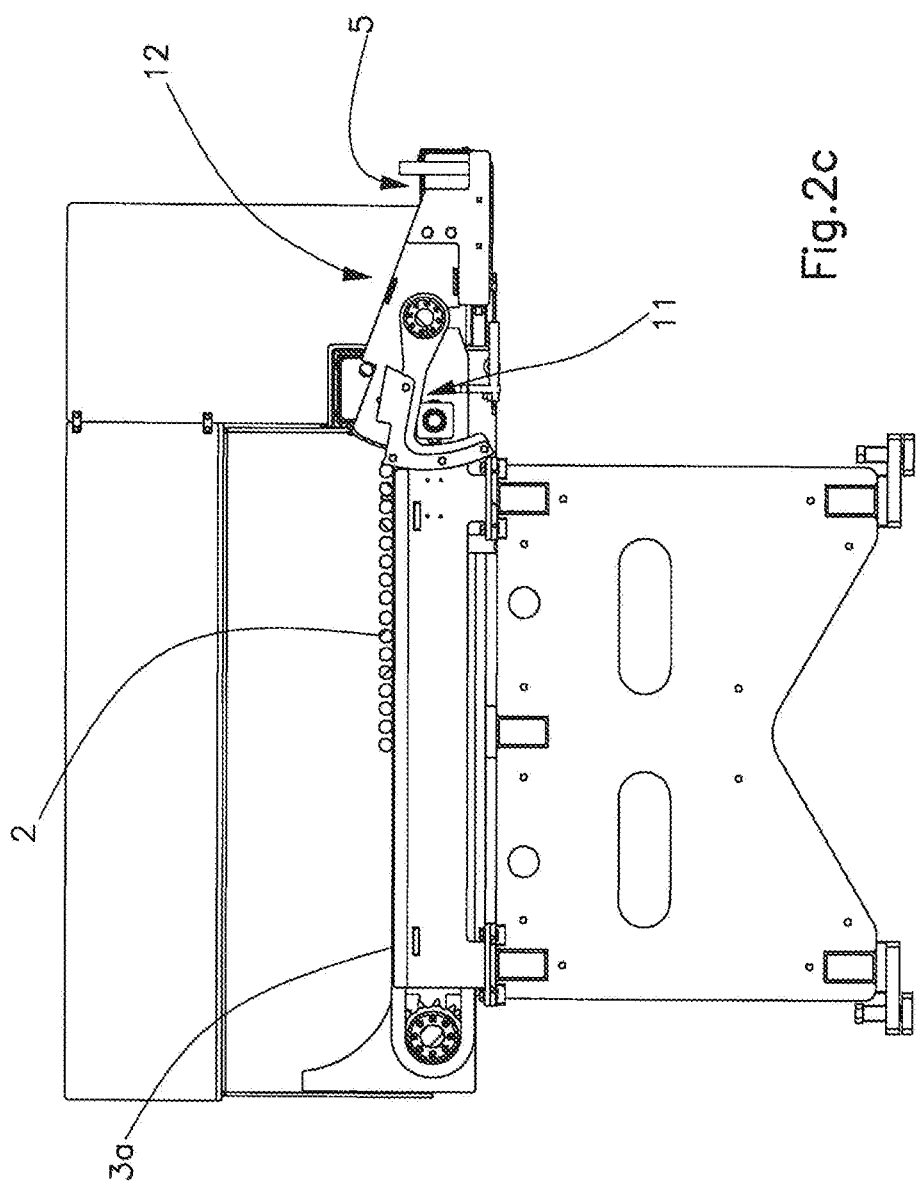

With particular reference to these figures, the reference numeral 1 indicates the loading assembly for oblong elements 2, in particular, but not limited to, bars, such as iron rods for reinforced concrete.

The loading assembly 1 is preferably associated with a feeding device 3 arranged alongside the loading assembly 1.

The loading assembly 1 cooperates with the feeding device 3 to collect a determined number of elements 2 therefrom and transfer it to a subsequent processing or handling station. In particular, the loading assembly 1 may, for example, allow the singularization of the elements 2 coming from the feeding device 3, as described in detail below and illustrated by way of example in FIGS. 2a to 2i. However, the loading assembly 1 may also collect from the feeding device 3 or load more than one element 2 thereon at a time, as can be understood from the following description.

Figure 3B:
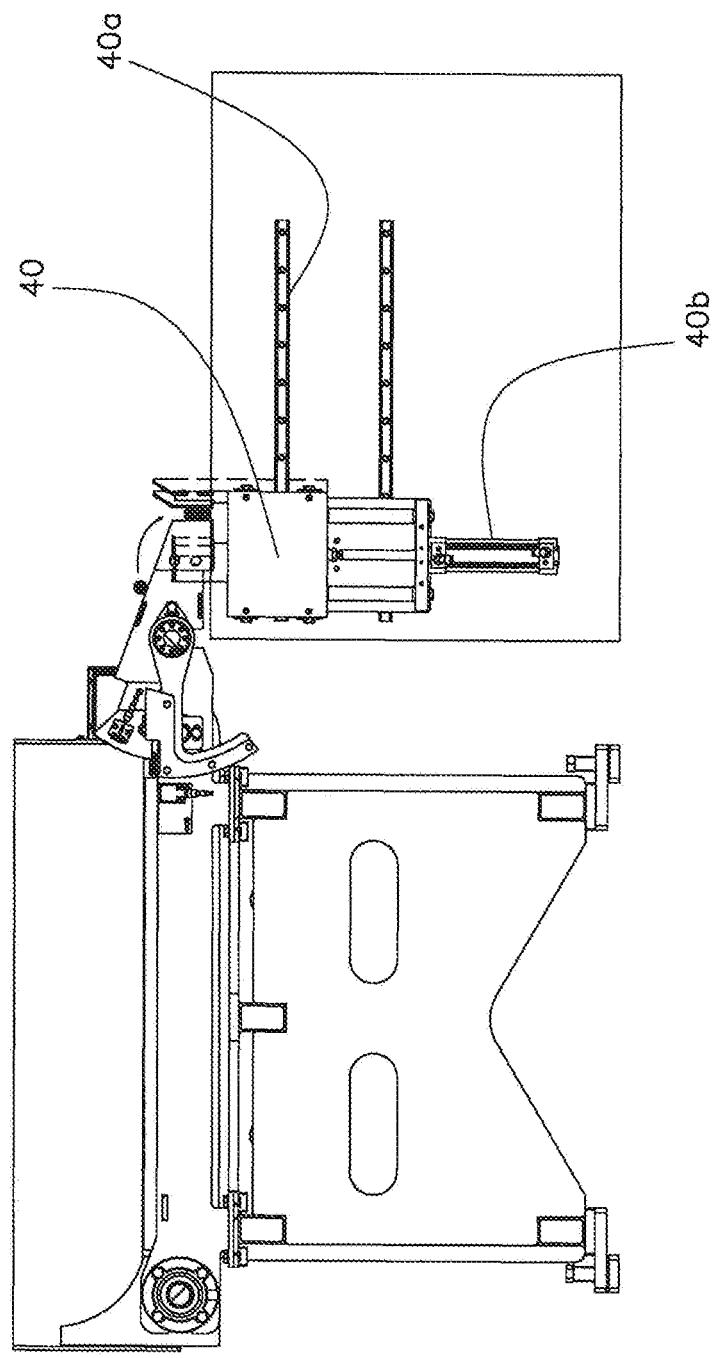
Figure 3C:
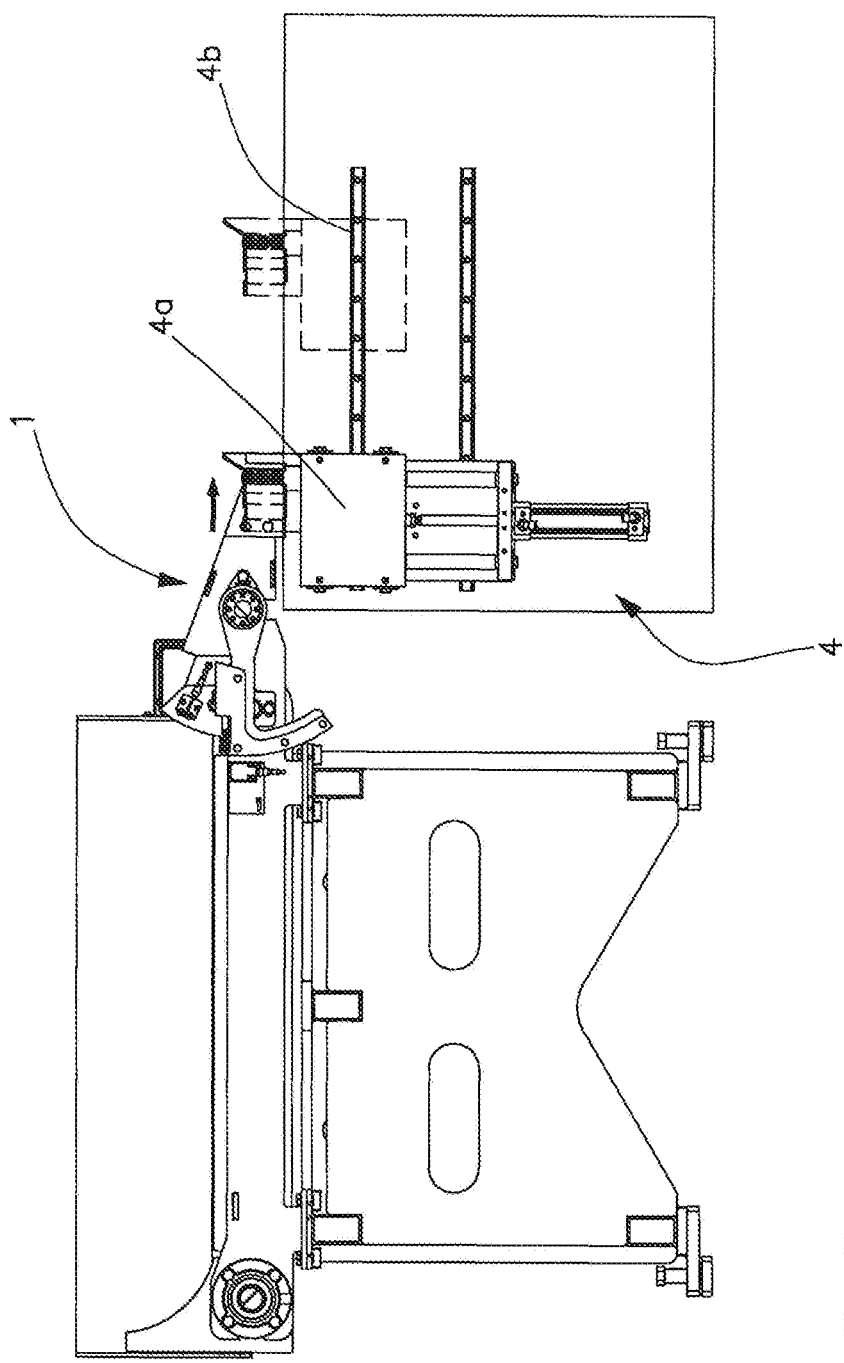

Preferably, the loading assembly 1 comprises a device 4 for transferring the elements 2, cooperating with the other operating members of the loading assembly (see for example FIGS. 3a, 3b and 3c).

The loading assembly 1 can be used, for example, in an apparatus for curving and/or bending the elements 2, or in other processing apparatuses, in order to singularize the elements 2 and/or feed them in a determined number to an operating station, processing or manipulation of the apparatus itself.

The feeding device 3 defines a feeding plane 3a, adapted to receive the elements 2, possibly cut to size, substantially oriented according to a longitudinal direction (see FIG. 1). The feeding plane 3a can be substantially horizontal, for example.

The feeding device 3 is preferably configured to arrange the elements 2 in an orderly manner, side by side.

The elements 2 can reach the feeding device 3 by means of an axial transport, for example with the aid of a roller path, a transversal transport, for example with the aid of tilting means, or by air, for example by a bridge crane.

The feeding device 3 preferably comprises at least one transversal positioning device 31, for example of the catenary type, to allow the fed elements 2 to be moved transversely (see for example FIG. 1).

Preferably the feeding device 3 comprises a plurality of transversal displacement devices 31, arranged in succession, for example uniformly distributed, along the longitudinal direction, to allow an optimal displacement for elements 2 of any length.

More precisely, the feeding device 3 has a longitudinal extension substantially equal to the maximum length of the elements 2 to be processed, so as to support bundles of elements 2 or single elements 2 of maximum length, arranged on the feeding plane 3a according to said substantially longitudinal orientation.

The feeding device 3 can also comprise alignment means 32 to ensure the correct alignment of the ends of all the fed elements 2. The alignment means 32 preferably shapes a flat abutment wall arranged at the end of the feeding plane 3a. Preferably, the alignment means 32 and the elements 2 are movable relatively to each other by an alternative alignment motion along the longitudinal direction so as to perform a hammering action on one or more elements at the same time (see FIGS. 1a and 2d).

It is preferably possible to provide, beside the feeding surface 3a, additional alignment means 33, as described in detail below, to ensure the correct alignment of the elements 2 loaded by the loading assembly 1, intended to be transferred to the next operating station.

Said additional alignment means may be similar to the alignment means 32.

The loading assembly 1 comprises a movable selector member 11 and a fixed chute 12, as operating members for loading a number of elements 2.

The selector member 11 is preferably made by means of a movable arm.

The operating members of the loading assembly 1 are preferably interposed between the feeding device 3 and the transferring device 4, to load the elements 2, collecting them from the feeding plane 3a, and releasing them in a transfer seat 5, so that they can be transferred by of the transfer device 4.

Preferably, the loading assembly 1 is also configured to position the elements 2 at an intermediate seat 6, beside the feeding device 3, between the feeding plane 3a and the transfer seat 5 (see FIG. 2a).

Advantageously, at least one seat between the transfer seat 5 and the intermediate seat 6 can be aligned with the alignment means 32 or with the additional alignment means 33 to enable the respective alignment operations. For example, the intermediate seat 6 can be longitudinally aligned to the alignment means 32 while the transfer seat 5 to the additional alignment means 33 (see FIG. 2a).

The selector member 11 preferably has a loading portion 11a and an outlet portion 11b, preferably separated by a shoulder 11c (see FIG. 2a).

Likewise, the chute 12 shapes an operating profile comprising in succession an abutment section 12a, adjacent to the feeding plane 3a, preferably an intermediate section 12b, which is for example flat and inclined and may be usefully aligned longitudinally to the alignment means 32, and an output section 12c, which is preferably flat and inclined, for rolling or sliding the elements 2 (see FIGS. 2a and 2b) towards the transfer seat 5.

The transfer seat 5 is associated with the chute 12 to receive the loaded elements 2, coming from the feeding surface 3a. More precisely, for example, the transfer seat 5 can be advantageously shaped by the same transfer device 4 cooperating with the other operating members of the loading assembly 1, as described in detail below. For reasons of simplicity, in FIGS. 1 and 2a to 2i the transfer device 4 forming the transfer seat 5 is partially shown to schematically illustrate the conformation of the transfer seat 5.

Alternatively, the transfer seat 5 can be shaped by an end portion of the chute 12 itself, being integrated therewith.

In any case, the transfer seat 5 has an open cavity on the output section 12c of the chute 12 for receiving the elements 2.

The transfer seat 5 can be oriented in any way.

According to the embodiment illustrated in FIGS. 2a to 2i, for example, the transfer seat 5 is oriented so as to receive the vertically superimposed elements 2 (see FIGS. 2h and 2i). As described below, the same transfer seat 5 can be shaped so as to receive the superimposed elements 2 according to an oblique alignment.

The intermediate section 12b and the output section 12c of the chute 12 are preferably separated by a shoulder section 12d (see FIG. 2b), wherein the aforementioned intermediate seat 6 is defined, to which the alignment means 32 is preferably aligned.

In particular, the abutment section 12a is configured to cooperate with the loading portion 11a of the selector member 11. In practice, the abutment section 12a is preferably curved and arranged backward, preferably in a radial direction, with respect to at least part of the loading portion 11a of the selector member 11, which is therefore a protruding portion with respect thereto. In this way a determined number of elements 2, for example only one element 2 at a time, can be intercepted between the loading portion 11a and the abutment section 12a and transported by the selector member 11 in the loading step, remaining in abutment of the abutment section 12a during the lifting motion, in particular swinging motion, of the selector member 11. In practice, the abutment section 12*a* has the function of guiding the number of elements 2 taken from the loading portion 11*a* of the selector member 11.

Preferably, the selector member 11 and the chute 12 are further movable relative to each other by a regulation motion, to regulate the extent of said protruding portion, as a function of the transverse dimension of the elements 2 to be loaded, in particular the diameter and/or the number of elements 2 selectable from the protruding portion of the selector member 11 at each loading cycle.

The selector member 11 is in fact movable, in particular oscillating around a substantially longitudinal axis, between a lowered position, in which the loading portion 11*a* is underneath the feeding plane 3*a*, and a raised, in particular rotated, position, in which the output portion 11*b* is aligned adjacent to the output section 12*c* of the chute 12, so as to cause the elements 2 to roll or slide thereon and to insert them into the transfer seat 5 (see FIG. 2*f*).

Preferably, the selector member 11 is movable through an intermediate position, at which the loading portion 11*a* is aligned with the intermediate portion 12*b* and the number of elements 2 loaded can thus roll or slide from the loading portion 11*a* to the intermediate portion 12*b* of the chute 12 resting against the shoulder section 12*d*, in the intermediate seat 6. At this juncture, the loaded elements 2 can advantageously be submitted to alignment operations by the alignment means 32. Furthermore, in the aforementioned raised position, the output portion 11*b* longitudinally intercepts the intermediate seat 6, so as to engage the elements 2 housed therein and thus unload them on the outlet portion 12*c*. This operation takes place usefully in a suitable phase relationship of the operating cycle of the transfer device 4, as described in detail below.

The transfer device 4 is movable with a transfer motion with respect to the loading assembly 1, between an engagement configuration 4*a*, approached at the transfer seat 5, in particular to the chute 12, and a transport configuration 4*b*, spaced away therefrom, to transfer the number of elements 2 inserted into the transfer seat 5 (see FIG. 3*c*).

According to a preferred embodiment, illustrated in FIGS. 3*a*, 3*b* and 3*c*, the transfer device 4 which carries the transfer seat 5 is, for example, movable in a translation transfer motion, between the engagement configuration 4*a*, approached to the chute 12, and the transport configuration 4*b*, spaced therefrom, to transfer the number of elements 2 loaded to an operating station arranged downstream (see in particular FIG. 3*c*).

In practice, the transfer seat 5 can be shaped by the transfer device 4 itself, as an autonomous member, which can be approached to the chute 12 to receive the elements 2.

In particular, the transfer device 4 can be made by means of a receiving member 40, for example shaped like a fork, so as to act, at least in part, in said engagement configuration 4*a*, as the transfer seat 5. The receiving member 40 is movable, for example sliding along guides 40*a*, of said transfer motion along a transverse direction A to the longitudinal, for example horizontal, direction.

The receiving member 40 can be further movable by a secondary motion, along a secondary, for example vertical, direction B along respective further guides 40*b*, to allow, for example, the insertion of the elements 2 loaded on the operating unit arranged downstream.

In particular, the receiving member 40 can be moved along the secondary direction B, for example under a work plane of the downstream operating unit, in a non-interference configuration, or in a work configuration, operationally aligned to said work surface, or again in a raised configuration with respect to this plane, to extract or insert the elements 2 from/into the transfer seat 5 or from/into the operating station arranged downstream. These configurations can be assumed by the receiving member 40, in an appropriate phase relationship, depending on the type of cooperating members upstream and/or downstream of the same receiving member 40.

The operation of the loading assembly 1 can be understood from the above description. In particular, in a first step the selector member 11 is arranged in the lowered position and the elements 2 are arranged on the feeding plane 3*a* (see FIG. 2*a*).

Subsequently, the selector member 11 is activated in the aforementioned lifting motion, to intercept, by means of the loading portion 11*a*, a number of elements 2 at the end of the feeding plane 3*a* and, thanks to the cooperation with the abutment section 12*a* of the chute 12, accompany them to the intermediate section 12*b*. Once the intermediate portion 12*b* has been reached, the selector member 11 can be lowered, while the loaded elements 2 reach, by rolling and/or slipping, the intermediate seat 6 shaped by the chute 12 and aligned with the alignment means 32 to be submitted to a first possible alignment.

The loading of the desired number of elements 2 on the chute 12 can also take place for subsequent loading cycles, operated thanks to the oscillation of the selector member 11.

Subsequently, in order to transfer the elements 2 to the transfer seat 5, the selector member 11 is raised again, so that the output portion 11*b*, adjacent to the loading portion 11*a*, can intercept the elements 2 housed in the intermediate seat 6 and thus reaching the height of the output section 12*c* of the chute 12, overcoming the shoulder portion 12*d*. The raised elements 2 can then roll and/or slide along the same output section 12*c*, to finally reach the transfer seat 5 and be aligned with the additional abutment means 33 (see FIG. 2*i*), for a further alignment action. For example, the elements 2 can be received in a stacked arrangement inside the transfer seat 5.

In particular, when the loaded elements 2 reach the chute 12 of the loading assembly 1, the transfer device 4 is in the engagement configuration 4*a*, so that the receiving member 40 can receive them at the transfer seat 5. For example, the elements 2 can roll or slide along the output section 12*c* and thus arrive, neatly stacked, inside the transfer seat 5 approached thereto.

Subsequently, the receiving member 40 is activated in the transfer motion along the transfer direction A, up to the transport configuration 4*b*, to transfer the elements 2 to the next operating station.

Figure 4A:
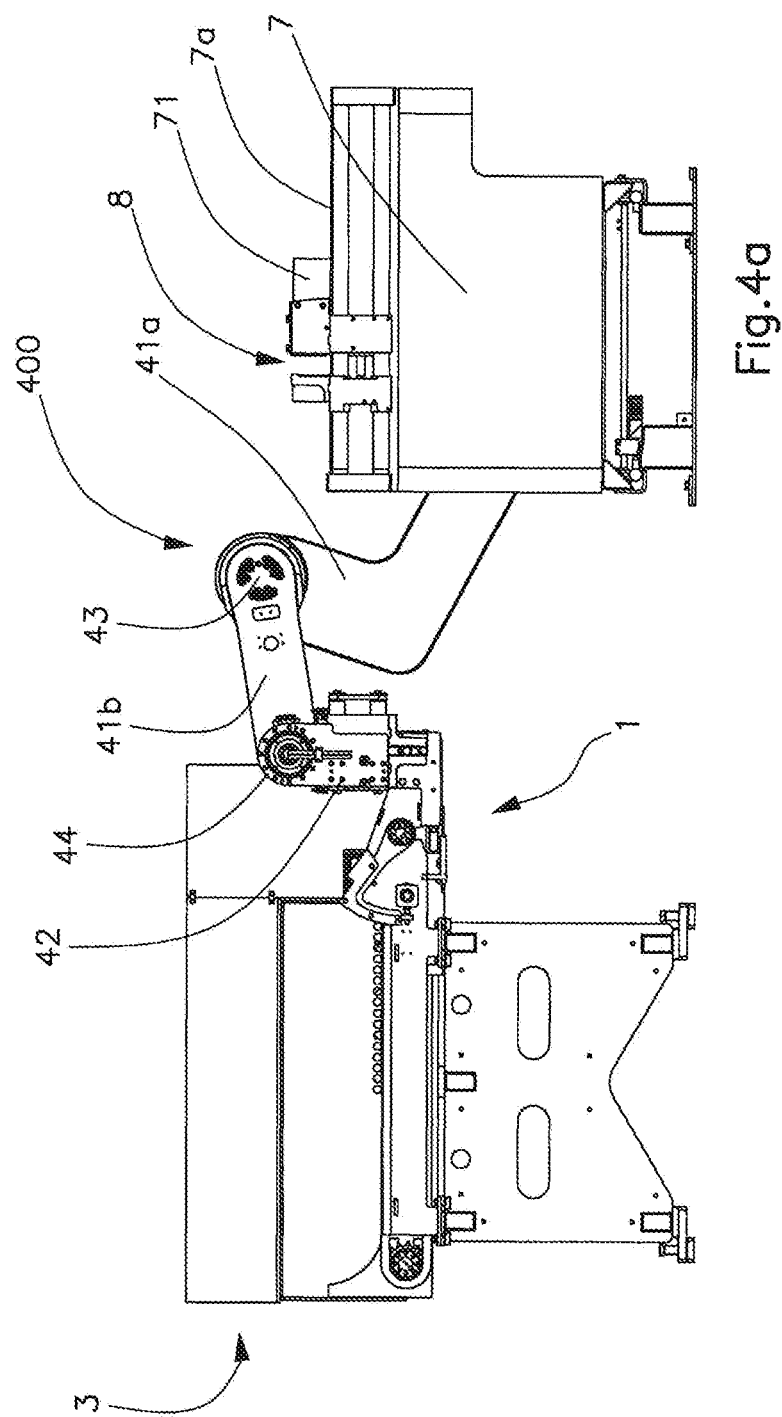
FIGS. 4a and 4b respectively show a lateral and perspective view of the loading assembly itself in cooperation with a device for transferring the elements, according to a different embodiment.
Figure 4B:
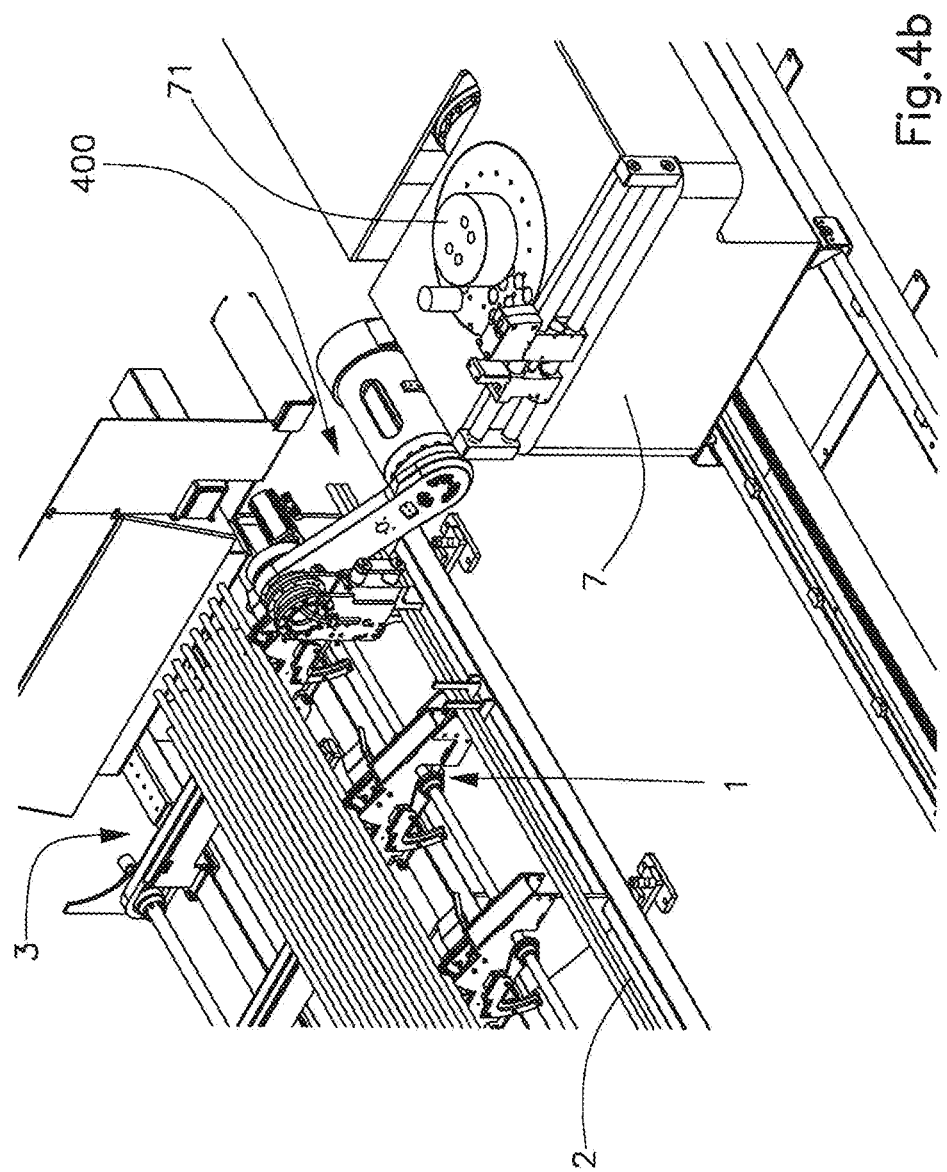

According to a different embodiment illustrated in FIGS. 4*a*, 4*b* and 5, otherwise quite similar to that described above, the transfer device 400 can be made by means of an articulated arm 41 carrying a gripping member 42, for example of the jaw type (see FIGS. 4*a* and 4*b*).

More precisely, the articulated arm 41 can be advantageously associated, in particular integrated, with an operating unit 7, for example a bending and/or curving unit. The operating unit 7 can for example comprise a bending head 71 (see FIG. 4*a*) or consist of other equipment for processing or manipulating the elements 2.

The articulated arm 41 can be pivoted to the base of the operating unit 7, in particular at a level below the relative work surface 7*a*.

The articulated arm 41 can comprise a first member 41*a* and a second member 41*b*, articulated at an intermediate axis 43 (see FIG. 5).

The gripping member 42 can be articulated to the second member 41b of the articulated arm 41 at an orientation axis 44 (see FIG. 5).

The particular shape of the articulated arm 41 allows the gripping member 42 to be oriented in any way, downwards or upwards, for example, to neatly transfer the elements 2 loaded from the transfer seat 5 to an insertion seat 8 of operating unit 7 (see FIG. 4a).

The operation of this embodiment can be understood from the preceding description.

In particular, at the transfer seat 5, the transfer device 400 may finally intervene, collecting the elements 2 loaded by means of the gripping member 42. In particular, the gripping member 42 can be oriented to intercept the elements loaded in the transfer seat 5 from above (see FIGS. 4a and 4b) or from below (see FIG. 5) or in any other position suitable for orderly collecting elements 2.

Figure 7B:
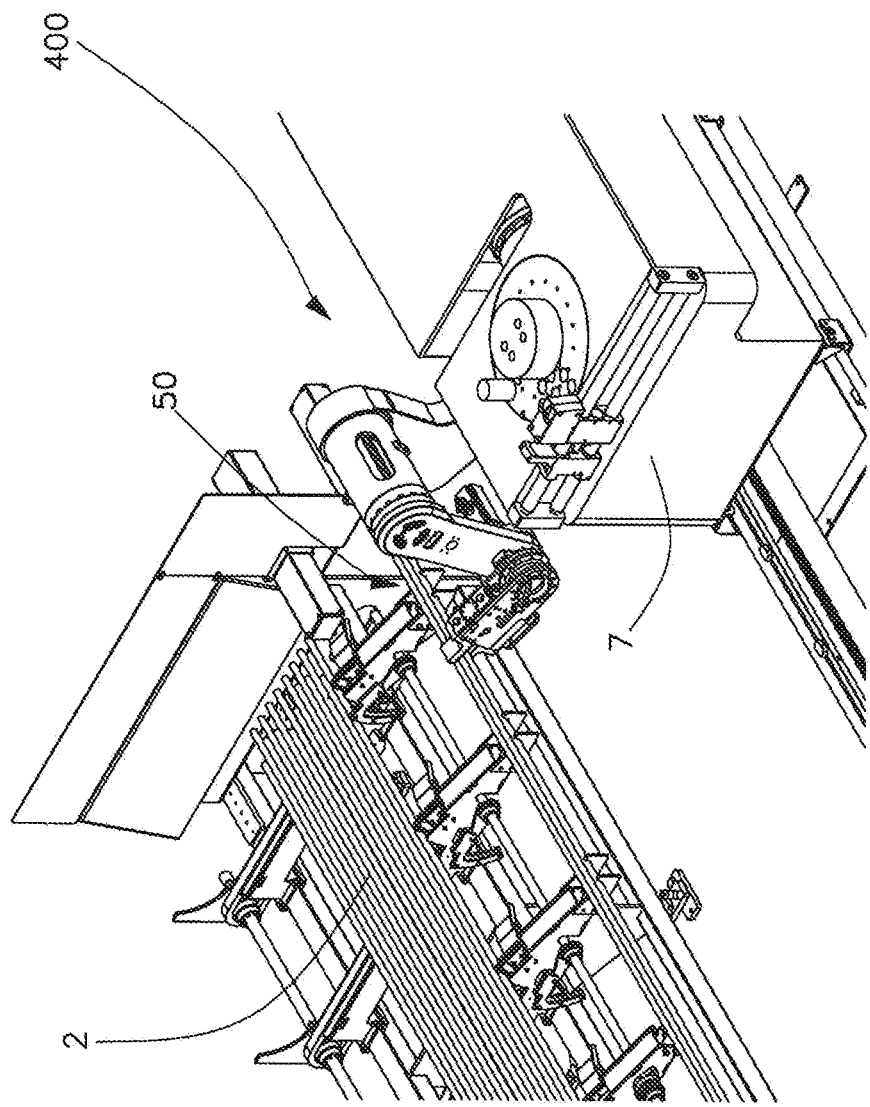

According to a further embodiment illustrated in FIGS. 6, 7a and 7b, otherwise quite similar to the one described above, the transfer seat 50 can form an inclined support surface for the elements 2, limited by an end shoulder 51, to arrange the loaded elements 2 in a correspondingly inclined orientation. In this case, the gripping member 42 of the transfer device 4 may collect the loaded elements 2 by rotating the gripping member 42 around the orientation axis 44 to orient it correspondingly (see FIGS. 7a and 7b).

The loading assembly for oblong elements according to the invention therefore achieves the purpose of allowing the loading of oblong elements to be operated in an optimal manner, in particular by minimizing the space occupied and optimizing production efficiency. In the practical embodiment of the invention, the used materials, as well as the shape and the dimensions, may be modified depending on needs.

Should the technical features mentioned in any claim be followed by reference signs, such reference signs were included strictly with the aim of enhancing the understanding of the claims and hence they shall not be deemed restrictive in any manner whatsoever on the scope of each element identified for exemplifying purposes by such reference signs.

The invention claimed is:

1. A loading assembly for oblong elements, in particular metal elements, such as for example bars, comprising a feeding plane, on which said elements are arranged, in operation, oriented according to a longitudinal direction, a movable selector member, a chute associated with said selector member and cooperating with a transfer seat to collect a number of elements loaded on said chute by means of said selector member, said selector member being movable with a lifting motion relative to said chute between a lowered position under said feeding plane and a raised position up to said chute, to intercept and transfer said number of said elements from said feeding surface to said chute, said loading assembly also comprising a transfer device for said elements, movable with a transfer motion between an engagement configuration, approached to said transfer seat, to engage said number of elements inserted in said transfer seat, and a transport configuration, spaced therefrom, to transfer said number of elements, and alignment means for subjecting said number of elements to respective alignment operations, said alignment means being aligned with said transfer seat and/or with an intermediate seat interposed between said feeding surface and said transfer seat, wherein said selector member forms an arm comprising a loading portion and an output portion, and said chute comprises an abutment section cooperating with said loading portion for separating said number of elements from said feeding plane and an output section for receiving said number of elements coming from said output portion, in said raised position an upper surface of said output portion of said selector member being at least approached to an upper surface of said output section of said chute, so as to define a sliding and/or rolling plane for said number of elements, and wherein said abutment section is arranged backward with respect to at least a part of said loading portion of said selector member, which therefore protrudes relative thereto, so that a selected number of elements may be intercepted between said loading portion and said abutment section and transported by said selector member, remaining in abutment with said abutment section during said lifting motion of said selector member.

2. The loading assembly of claim 1, wherein at least one of said selector member and said chute is movable with a regulation motion with respect to the other one, to regulate as much as said loading portion protrudes with respect to said abutment section as a function of the number of elements to be loaded.

3. The loading assembly of claim 1, wherein said chute comprises an intermediate section between said abutment section and said output section, a shoulder section being interposed between said intermediate portion and said output section to define an intermediate seat for said number of elements, said selector member being movable through an intermediate position, wherein said number of elements is released from said loading portion to said intermediate portion of said chute into said intermediate seat.

4. The loading assembly of claim 3, wherein said selector member comprises a shoulder between said loading portion and said output portion to house at least one said element.

5. A loading assembly of claim 1, wherein said selector member may oscillate with respect to said chute around a respective longitudinal axis.

6. A loading assembly of claim 1, wherein said transferring device is made of a receiving member at least partially conforming said transfer seat.

7. The loading assembly of claim 6, wherein said receiving member is of the type with jaws movable reciprocally between an open configuration and a closed configuration, said transfer seat being shaped in said engagement configuration of said transferring member by an end wall of said chute and by a jaw of said receiving member arranged in said open configuration.

8. A loading assembly of claim 1, wherein said transferring device comprises an articulated arm and a gripping member articulated to said articulated arm around an orientation axis.

9. The loading assembly of claim 8, wherein said articulated arm comprises a first member and a second member mutually articulated at an intermediate axis.

10. A loading assembly of claim 8, wherein said gripping member is orientable around said orientation axis for collecting said elements from said transfer seat from below and from above with respect to said elements inserted in said transfer seat.

11. A loading assembly of claim 1, further comprising a device for feeding said elements, capable of receiving said elements on said feeding plane, said selector member and said chute being interposed between said feeding device and said transfer device.

12. A loading assembly of claim 1, wherein said transfer motion is in a direction transverse to said longitudinal direction.

\* \* \* \* \*